United States Patent
Liu et al.

(10) Patent No.: US 8,269,751 B2
(45) Date of Patent: Sep. 18, 2012

(54) PHOTO ELEMENT AND DRIVING METHOD THEREOF AND LIQUID CRYSTAL DISPLAY

(75) Inventors: Ting-Chung Liu, Taipei (TW); Po-Yang Chen, Tainan (TW); Hsien-Tang Hu, Taipei (TW); Chien-Chih Hsiau, Taipei (TW)

(73) Assignee: Hannstar Display Corp., Taipei (TW)

( * ) Notice: Subject to any disclaimer, the term of this patent is extended or adjusted under 35 U.S.C. 154(b) by 546 days.

(21) Appl. No.: 12/626,669

(22) Filed: Nov. 26, 2009

(65) Prior Publication Data

US 2010/0238140 A1 Sep. 23, 2010

(30) Foreign Application Priority Data

Mar. 20, 2009 (TW) ................................ 98109166 A (51) Int. Cl.
*G06F 3/042* (2006.01)
(52) U.S. Cl. ........................................ 345/176; 345/207
(58) Field of Classification Search ........................ None
See application file for complete search history.

(56) References Cited

U.S. PATENT DOCUMENTS 6,831,710 B2 * 12/2004 den Boer .......................... 349/48
2010/0171724 A1 * 7/2010 Chang et al. ................... 345/175

* cited by examiner

*Primary Examiner* — Jason Olson
(74) *Attorney, Agent, or Firm* — Huffman Law Group, P.C.

(57) ABSTRACT

A photo element includes a photo thin film transistor (TFT), a switch thin film transistor, and a compensation thin film transistor. A bias line provides a bias voltage to the photo TFT. The photo TFT generates a photo-induced current under an illuminated environment. A first switch line provides a voltage to open the switch TFT, and thus the photo-induced current is read out through a readout line. A second switch line provides compensation current to open the compensation TFT. The compensation current applies a reverse-biased stress to the photo TFT; therefore the threshold voltage and sensitivity of the photo TFT can be maintained.

16 Claims, 8 Drawing Sheets

PHOTO ELEMENT AND DRIVING METHOD THEREOF AND LIQUID CRYSTAL DISPLAY

BACKGROUND OF THE INVENTION

1. Field of the Invention

The present invention relates to a Liquid Crystal Display, and more particularly, to a Liquid Crystal Display with in-cell touch panel.

2. Description of the Prior Art

Typically the input method of a touch panel includes electromagnetic induction, capacitance-sensing type, resistance-sensing type, and the like. The touch panel is arranged at the outside of a display device, such as a Cathode Ray Tube Display or a Liquid Crystal Display, and a transparent layer is arranged between a user and the screen of the input device, which has many icons. The user instructs the display device by touching or approaching one or more the icons on the screen via the finger or a pen. In addition, the display device may be directly inputted via the handwriting, which replaces the mouse and the keyboard.

As the touch panel is applied to a Liquid Crystal Display, about 20% of the transmittance of the Liquid Crystal Display will be lowered down. Besides, the multiple reflection of the transparent layer and the optical films of the Liquid Crystal Display result in the degradation of the contrast ratio or result in the glare.

Further, the Liquid Crystal Display may include another type of touch panel, which is typically called "In-cell touch panel". The In-cell touch panel comprises many photo elements capable of sensing the light and thus inducing photo-induced currents. By sensing the variance of the photo-induced current, the point of the touched event can be determined Because the In-cell touch panel can be embedded in the thin-film transistor substrate of the Liquid Crystal Display, the steps of the manufacture process will not be increased and the equipment and manufacture cost can be saved.

Figure 1:
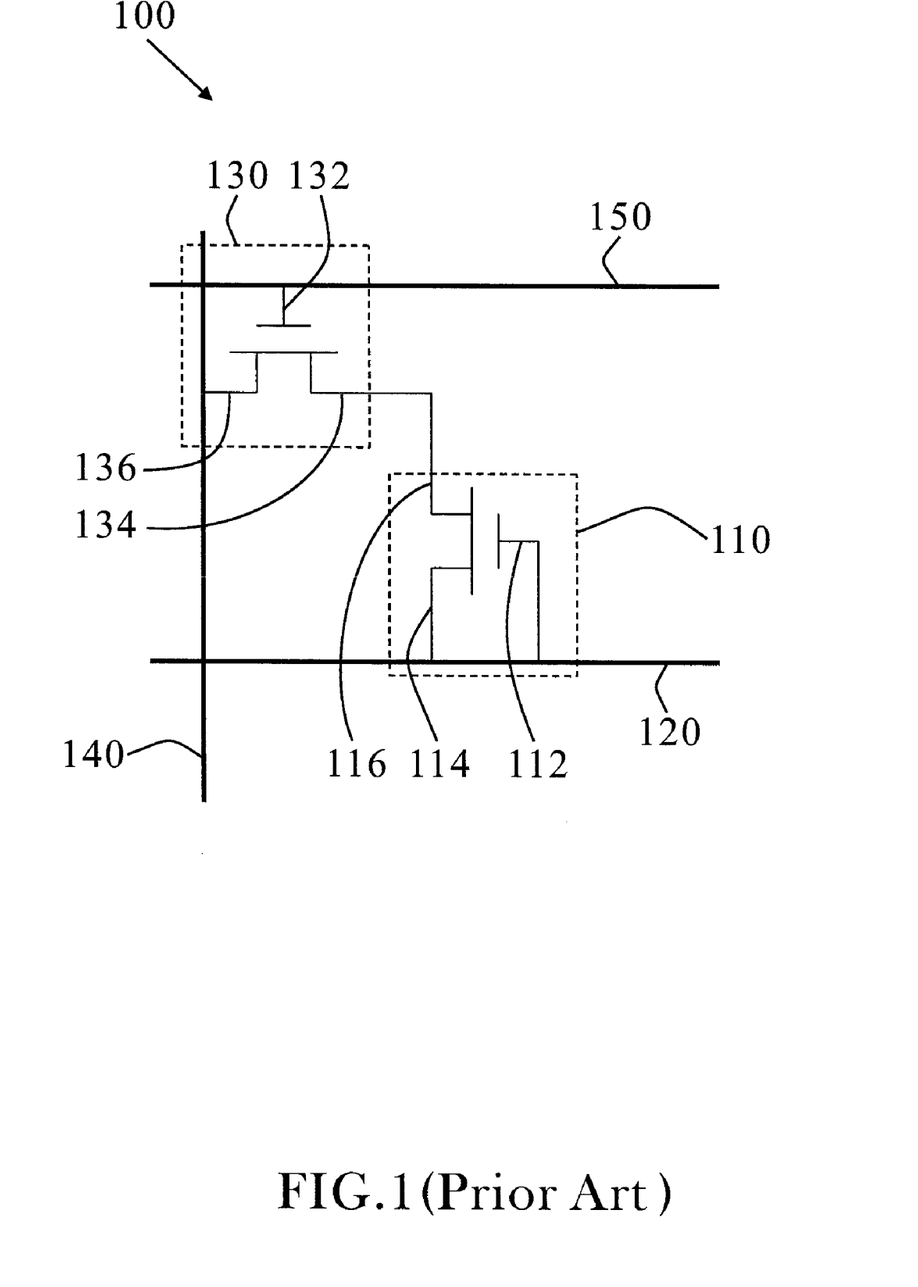
FIG. 1 is a diagram of a conventional photo element.

FIG. 1 shows a conventional photo element 100 of an In-cell touch panel. The photo element 100 comprises a photo thin-film transistor 110 and a switch thin-film transistor 130. The source 136 of the switch thin-film transistor 130 is connected to a readout line 140; the gate 132 of the switch thin-film transistor 130 is connected to a switch line 150; the drain 134 of the switch thin-film transistor 130 is connected to the source 116 of the photo thin-film transistor 110. Further, The gate 112 and drain 114 of the photo thin-film transistor 110 are connected to a bias line 120, which provide voltages to the photo thin-film transistor 110. When the switch thin-film transistor 130 is opened after receiving a voltage given by the first switch line 150, a photo-induced current generated by the photo thin-film transistor 110 will be transmitted through the switch thin-film transistor 130 and read out via the readout line 140. Generally, the value of the photo-induced current is proportional to the illumination of the light illuminated on the photo thin-film transistor 110. When the user touches the touch panel by a finger or uses a light pen to illuminate the touch panel, the illumination of the light of the touch site will be decreased or increased. Thus the value of the photo-induced current is changed, and therefore the point of the touch event can be determined.

The In-cell touch panel is arranged in the thin-film transistor substrate, which includes a pixel array. Some pixels of the pixel array are regularly embedded an above-mentioned photo element 100, thus forming some readout pixels.

Figure 2:
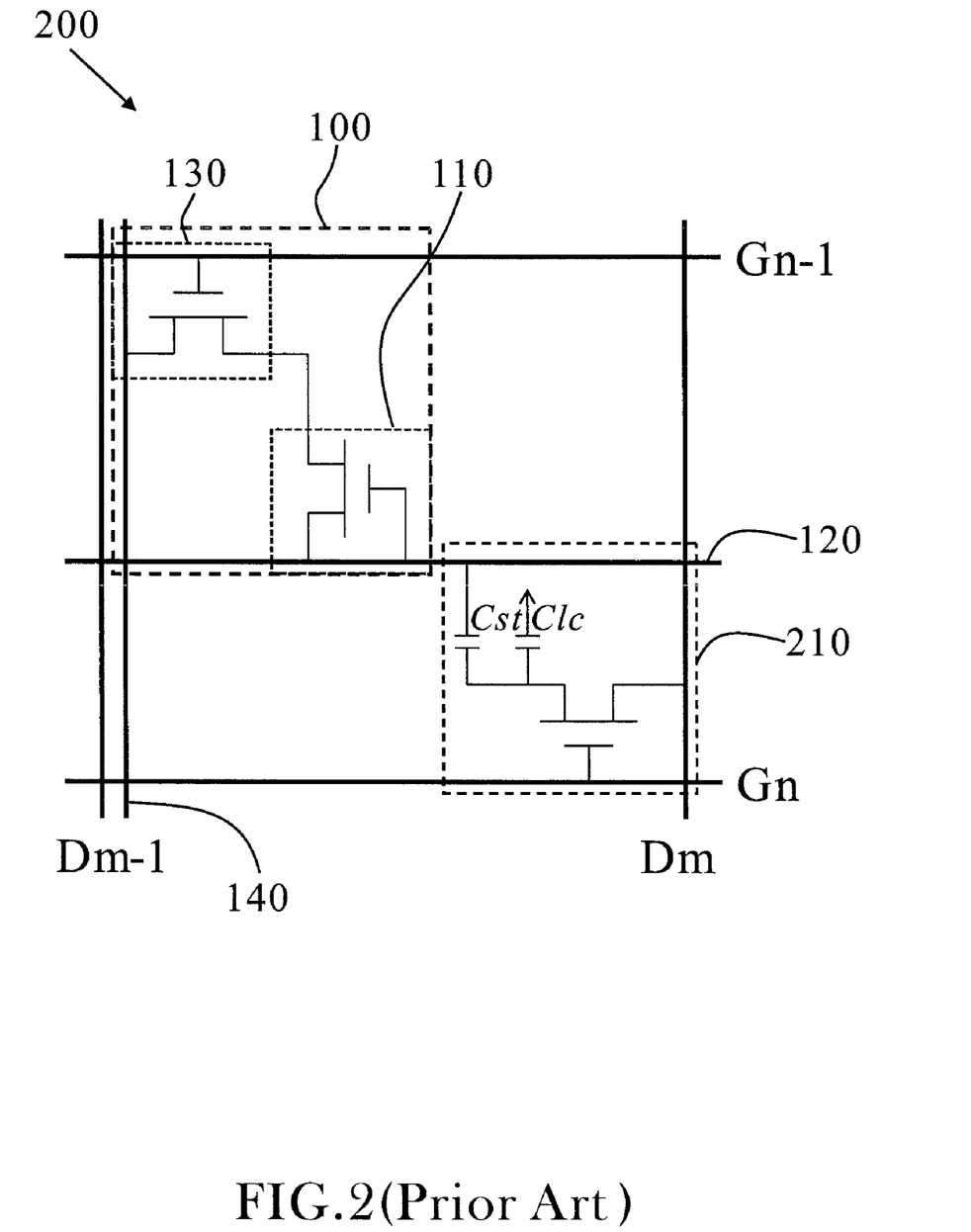
FIG. 2 is a diagram of a conventional readout pixel that includes the conventional photo element.

FIG. 2 shows a conventional readout pixel 200. The readout pixel 200 comprises a pixel element 210 and an above-mentioned photo element 100. A bias line 120 is employed for not only providing a reference voltage to the storage capacitor Cst of the pixel element 210 but also providing a voltage to drive the photo-induced current to be read out. In addition, the switch line 150 of FIG. 1 corresponds to scan lines Gn-1, Gn of FIG. 2 and Dm-1, Dm denote data lines for providing voltages written to the pixel element 210.

Under operation, the switch thin-film transistor 130 of the photo element 100 is typically shadowed but the photo thin-film transistor 110 of the photo element 100 is illuminated; therefore after a long-term illumination, the reliability of the photo element 100 will be decreased, the sensitivity will be reduced, and the value of the photo-induced current will be decayed. The worse decay of the photo-induced current reduces the signal to noise (S/N) ratio and may result in the incorrect point of touch event to be determined Hence, the reliability of the photo element 100 after a long-term illumination is an important issue.

Figure 3:
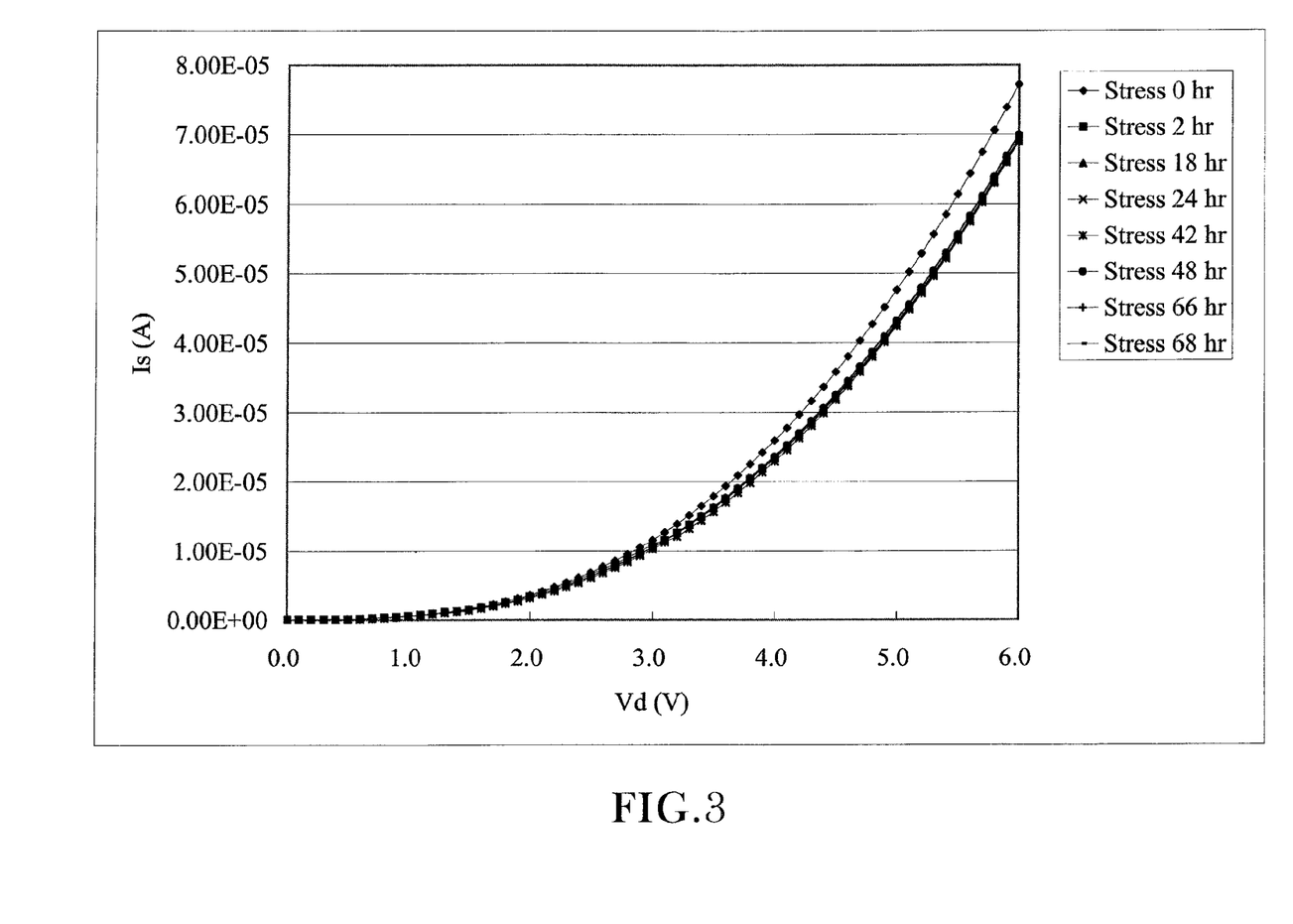
FIG. 3 shows an I-V curve of a photo element when the photo element is operated at dark state after variant period of times.
Figure 4:
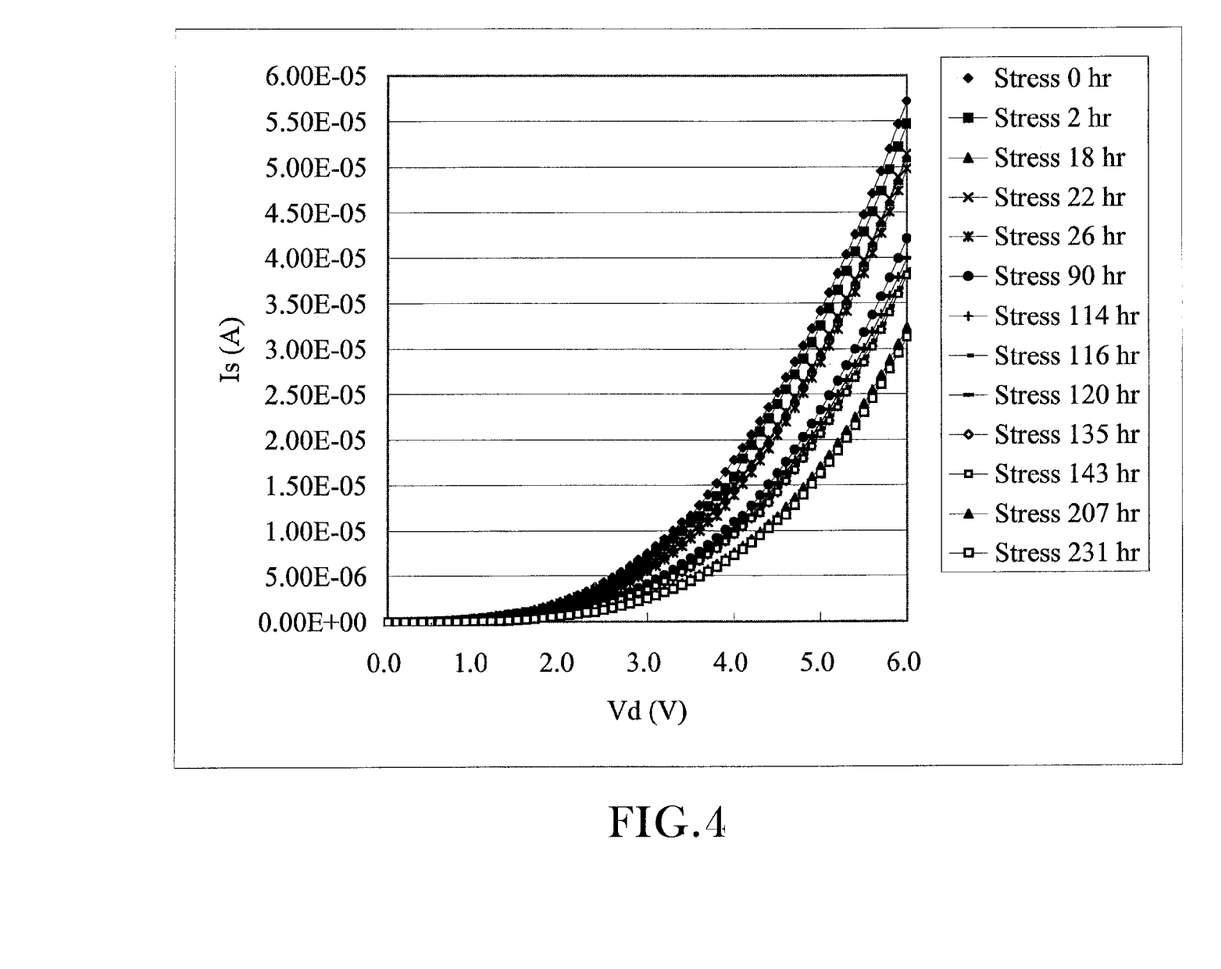
FIG. 4 is an I-V curve of a photo element when the photo element is operated at 1500 lux after variant period of times.

When the photo element is operated at office, the illumination of the environment is typically about 300 to 500 lux; when the photo element is operated at the outdoor, the illumination of the environment is typically about 1000 lux (a cloudy day) to 30000 lux (a sunny day). FIG. 3 and FIG. 4 show an I-V curve of a photo element after a long-term illumination, wherein FIG. 3 shows that the photo element is operated at indoor, dark environment, FIG. 4 shows that the photo element is operated at 1500 lux, Vd denotes voltages (unit: volt, V) given to the gate and drain of the photo thin-film transistor, and Is denotes currents (unit: ampere, A) measured at the source of the photo thin-film transistor. The bias voltage applied to the drain of the photo thin-film transistor is 2.63 V in FIG. 3 and 1.95 V in FIG. 4, and both of the FIG. 3 and FIG. 4 have the same duty cycle 1/600.

As shown in FIG. 3, when a voltage, for example, 6V, is stressed to the gate of the photo thin-film transistor for 2 hours and more, the photo-induced current is initially at 77.2 μA then decayed to 70.0 μA and maintained at 70.0 μA; therefore the reliability is acceptable when the photo element is operated at dark environment. By contrast, as shown in FIG. 4, when a voltage, for example, 6V, is stressed to the gate of the photo thin-film transistor for 231 hours, the photo-induced current is decayed about 45.28%; therefore the reliability is unacceptable when the photo element is operated at 1500 lux. The worse decay of the photo-induced current will cause the incorrect point of touch event to be determined Therefore, it would be advantageous to liquid crystal display device having novel photo elements that can overcome the defects of the prior art.

SUMMARY OF THE INVENTION

The object of the present invention is to provide a novel photo element and driving method thereof and a Liquid Crystal Display having the photo element that can overcome the defects of the prior art.

According to the object, the present invention provides a photo element that comprises a photo thin-film transistor; a readout line; a switch thin-film transistor, the source of the switch thin-film transistor being connected to the readout line, the gate of the switch thin-film transistor being connected to a first switch line, and the drain of the switch thin-film transistor being connected to the source of the photo thin-film transistor; a bias line, the gate and the drain of the photo thin-film transistor being connected to the bias line; and a compensation thin-film transistor, the gate and the drain of the compensation thin-film transistor being connected to a second switch line, the source of the compensation thin-film transistor being connected to the drain of the switch thin-film transistor.

According to the object, the present invention provides a driving method of the above-mentioned photo element, the driving method comprising: providing continuously a bias voltage to the bias line, so that the photo thin-film transistor is maintained at open state, and a photo-induced current generated by the photo thin-film transistor is transmitted from the source of the photo thin-film transistor to the switch thin-film transistor; applying a high voltage to the first switch line, so that the switch thin-film transistor is opened, and the photo-induced current is transmitted from the drain of the switch thin-film transistor to the source of the switch thin-film transistor to be read out via the readout line; applying a low voltage to the first switch line, so that the switch thin-film transistor is closed; and applying a high voltage to the second switch line, so that the compensation thin-film transistor is opened; wherein the voltage applied to the second switch line is higher than the voltage applied to the bias line.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts. It should be noted that any drawings presented are in simplified form and are not to precise scale. In reference to the disclosure herein, for purposes of convenience and clarity only, directional terms, such as, top, bottom, left, right, up, down, over, above, below, beneath, rear, and front, are used with respect to the accompanying drawing. Such directional terms should not be construed to limit the scope of the invention in any manner.

Some public documents recite that after a long-term illumination, the life of the free carrier of the amorphous silicon film is reduced, causing the electric conductivity and the value of the photo-induced current of the amorphous silicon film decreased. This implies that the threshold voltage of the photo thin-film transistor may also be affected by illumination of light. To assure this assumption, applicant proceeds with a sequence of experiments, which the threshold voltages of the photo thin-film transistor are checked after a variant period of time of illumination; the experiment results are shown in FIG. 5.

Figure 5:
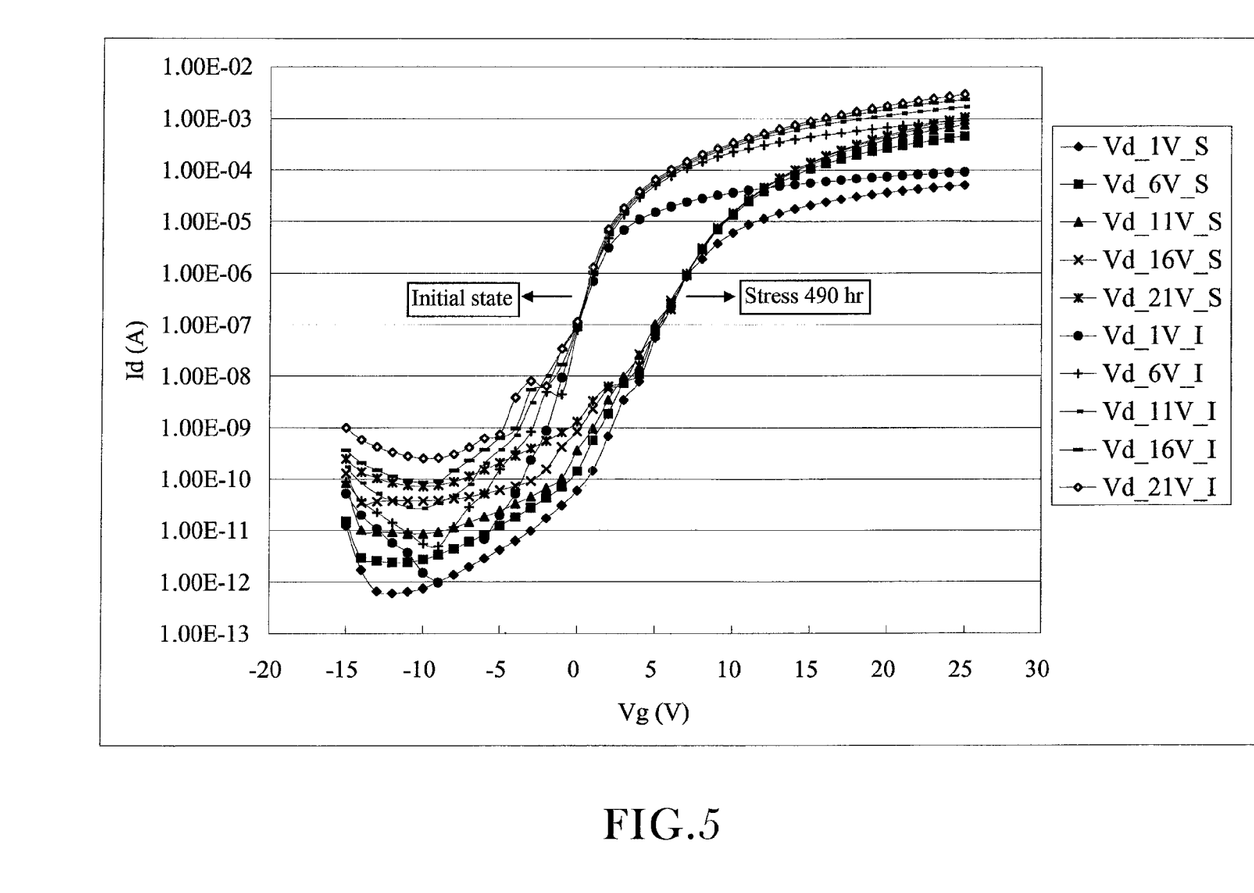
FIG. 5 shows the threshold voltage of a photo element will be increased after a long-term illumination.

In FIG. 5, Vg denotes voltages stressed to the gate of the photo thin-film transistor, and Id(A) denotes values of the photo-induced current measured at the source of the photo thin-film transistor. The photo thin-film transistors in FIG. 5 are all operated at an environment of constant illumination, 1500 lux, wherein the curve Vd_1V_S denotes an I-V curve of the photo thin-film transistor when 1V of voltage is stressed to its drain and −15-25V of voltages are stressed to its gate after 490 hrs; by contrast, the curve Vd_1V_I denotes an I-V curve of the photo thin-film transistor when 1V of voltage is stressed to its drain and −15-25V of voltages are stressed to its gate after 0 hrs, that is, at initiate state no any voltage is stressed. The other curves shown in FIG. 5 are similar to curve Vd_1V_S and Vd_1V_I, the description therefore are omitted.

The experiment results discover that the threshold voltages of every curve are shifted from the 0V to be increased to 6.3V after 490 hrs voltage and illumination stressed. The experiment results also show that the photo-induced current decays three or four orders of magnitudes within the 1.7-3.2 voltage range, which is the possible operating voltage of the photo thin-film transistor.

The increased threshold voltage means that the photo thin-film transistor needs a larger positive voltage applied for inducing the same quantity of photo-induced current as before. To solve this problem, the present invention provides a photo element and driving method thereof that can stop the threshold voltage from being increased.

Figure 6:
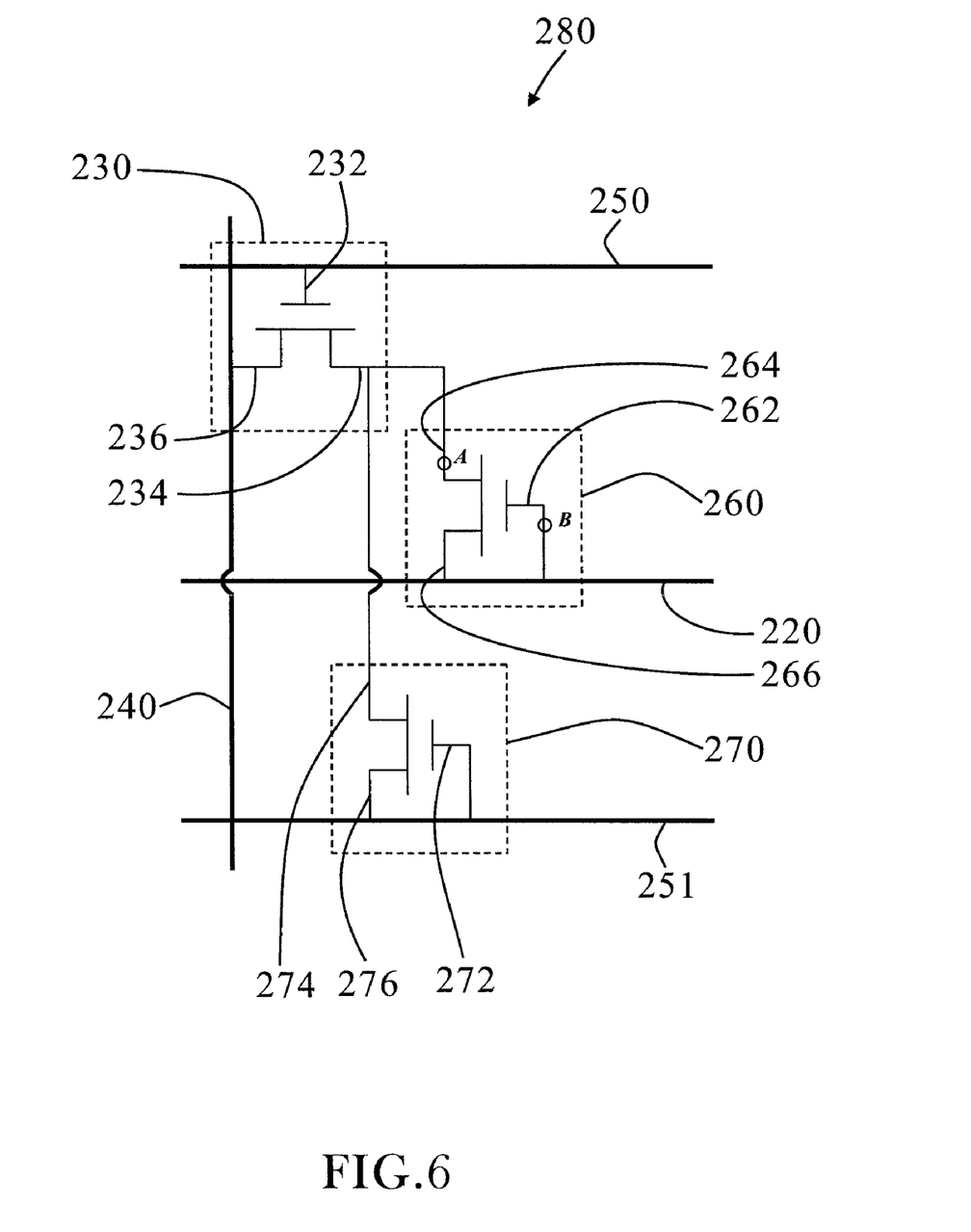
FIG. 6 is a diagram of a photo element according to one embodiment of the present invention.

FIG. 6 shows a photo element 280 according to one embodiment of the present invention. The photo element 280 comprises a switch thin-film transistor 230, a photo thin-film transistor 260, and a compensation thin-film transistor 270.

The switch thin-film transistor 230 and the compensation thin-film transistor 270 shown in FIG. 6 may be shadowed by masking material, such as black matrix; therefore the switch thin-film transistor 230 and the compensation thin-film transistor 270 are operated at dark environment, the reliability being acceptable and maintainable; by contrast, at least a portion or the whole portion of the photo thin-film transistor 260 is operated at illuminated environment without any masking material above it. Where, the source 236 of the switch thin-film transistor is connected to a readout line 240; the gate 232 of the switch thin-film transistor is connected to a first switch line 250; the drain 234 of the switch thin-film transistor is connected to the source 264 of the photo thin-film transistor 260. In addition, the gate 262 and the drain 266 of the photo thin-film transistor are connected to a bias line 220, which provides voltages to the photo thin-film transistor, and the gate 272 and the drain 276 of the compensation thin-film transistor 270 are connected to a second switch line 251; the source 274 of the compensation thin-film transistor is connected to the drain 234 of the switch thin-film transistor 230.

Figure 7:
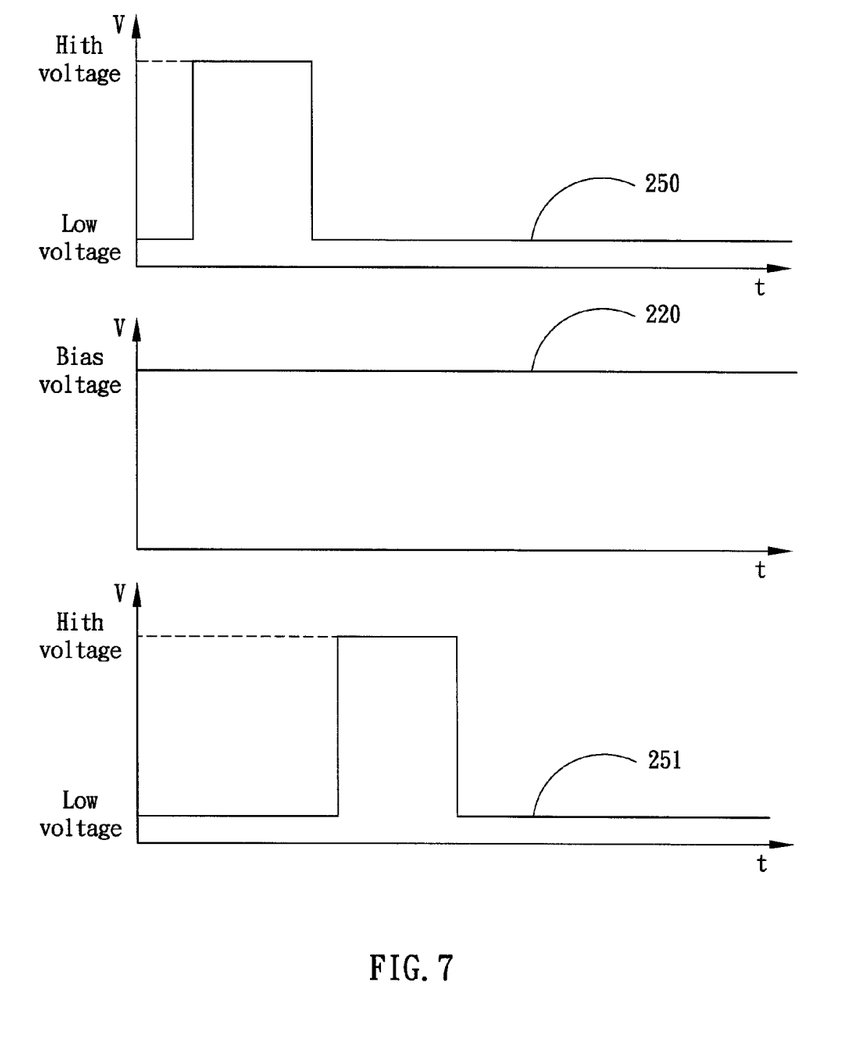
FIG. 7 illustrates a driving method of the photo element shown in FIG. 6 according to one embodiment of the present invention.

FIG. 7 illustrates a driving method of structure shown in FIG. 6 according one embodiment of the present invention. First, providing continuously a bias voltage, for example 3-5V, to the bias line, so that the photo thin-film transistor 260 is maintained at open state, and a photo-induced current generated by the photo thin-film transistor 260 is transmitted from the source 264 to the switch thin-film transistor 230. At the same time or later, a high voltage, for example 15 or 16V, is applied to the first switch line 250, so that the switch thin-film transistor 230 is opened, and the photo-induced current is transmitted from the drain 234 to the source 236 of the switch thin-film transistor to be read out via the readout line 240.

Later, a low voltage, for example 0-1V, is applied to the first switch line, so that the switch thin-film transistor 230 is closed. Later, a high voltage, for example 15 or 16V, is applied to the second switch line 251, so that the compensation thin-film transistor is opened, which will give a reverse-biased voltage to the photo thin-film transistor 260, wherein the voltage applied to the second switch line 251 is higher than the voltage applied to the bias line 220.

The above-mentioned method employs a theory to stop the photo-induced current from decay: when a high voltage is applied to the first switch line 250, the photo-induced current generated by the photo thin-film transistor 260 is transmitted through the switch thin-film transistor 230 to be read out via the readout line 240; at this time the electrical potential of point B is greater than the electrical potential of point A ($V_B-V_A>0$), so that it means that a forward-biased voltage is stressed to the photo thin-film transistor 260, causing the threshold voltage increased; when a high voltage is applied to the second switch line 251, the compensation thin-film transistor is opened; at this time the electrical potential of point B is smaller than the electrical potential of point A ($V_B-V_A<0$), so that it means that a reverse-biased voltage is stressed to the photo thin-film transistor 260, thereby the photo thin-film transistor 260 is compensated by the reverse-biased voltage; therefore the threshold voltage will not be increased, and the value of the photo-induced current will not be decayed.

Figure 8:
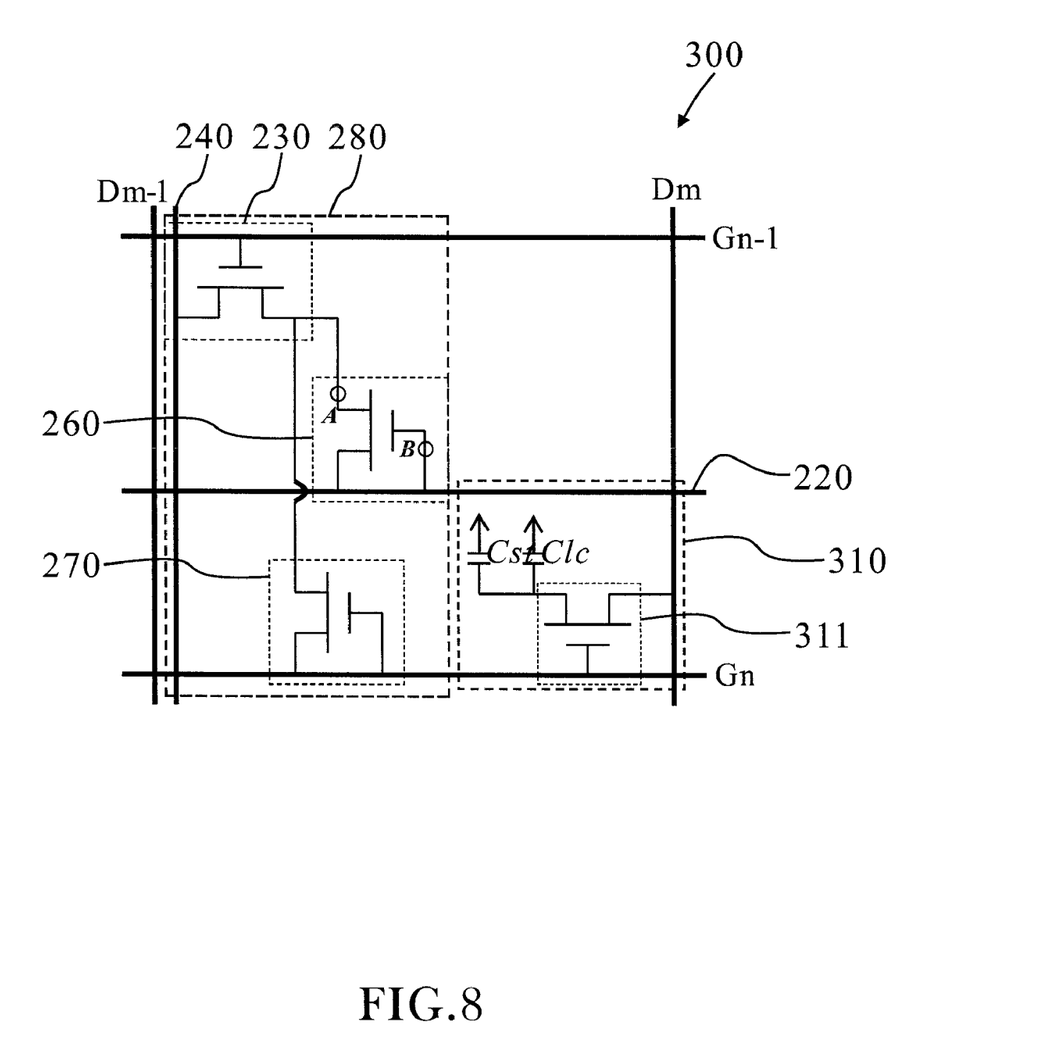
FIG. 8 is a diagram of a readout pixel in which a photo element of FIG. 6 is arranged according to one embodiment of the present invention.

FIG. 8 illustrate a readout pixel 300 that employs the photo element of FIG. 6 according to one embodiment of the present invention. The photo element of the present invention may be applied to a Liquid Crystal Display, which comprises a thin-film transistor substrate, which comprises a plurality of gate lines and a plurality of data lines where a plurality of pixels are defined, and a plurality of photo elements of the present invention are regularly arranged in some or all of the plurality of pixels, thereby forming a plurality of readout pixels. In an embodiment of the present invention, one photo element of the present invention is arranged in each blue pixel (precisely, blue sub-pixel).

The readout pixel 300 comprises a pixel element 310 and an above-mentioned photo element 280. The structure of the pixel element 310 may be the same as prior art; the description of it is omitted. For higher aperture ratio, the gate lines may replace the switch lines shown in FIG. 6. For example, the first switch line 250 corresponds to gate line Gn-1, and the second switch line 251 corresponds to gate line Gn. The pixel element 310 comprises a pixel thin-film transistor 311, as shown in the FIG. 8 its gate being connected to the gate line Gn, its source being connected to the data line Dm. In another embodiment of the present invention, the gate of the pixel thin-film transistor 311 is connected to the gate line Gn-1, and/or the source of the pixel thin-film transistor 311 is connected to the data line Dm-1.

In addition, for a higher aperture ratio and higher uniformity, a switch (not shown) may be employed so that a data line functions not only the data line but also the readout line. For example, a switch and the source of the pixel thin-film transistor 311 are connected to the data line Dm-1 and the gate of the pixel thin-film transistor 311 is connected to the gate line Gn; when a high voltage is applied to the gate line Gn-1, the switch is switched so that the data line Dm-1 functions as the readout line; when a high voltage is applied to the gate line Gn, the switch is switched so that the data line functions as the data line and a voltage is written to the pixel thin-film transistor 311.

In addition, because the illumination will affect the threshold voltage of the photo thin-film transistor and the needful sensitivity could be variant that depend on the illumination of the environment, the Liquid Crystal Display of the present invention may further comprises a detecting element (not shown) for detecting the illumination of the environment. The detected illumination is feedback to a microprocessor, which determines the value of voltage applied to bias line 220 according to the detected illumination.

The driving method of FIG. 7 can be applied to the readout pixel 300 of FIG. 8. When a high voltage is applied to the gate line Gn-1, the switch thin-film transistor 230 is opened and the photo-induced current generated by the photo thin-film transistor 260 is transmitted through the switch thin-film transistor 230 to be read out via the readout line 240; at this time the electrical potential of point B is greater than the electrical potential of point A, so that it means that a forward-biased voltage is stressed to the photo thin-film transistor 260; when a high voltage is applied to the gate line Gn, the pixel thin-film transistor 311 is opened and a gray level voltage is written into the pixel thin-film transistor 311; meanwhile, the compensation thin-film transistor 270 is opened and a compensation current is written to point A; at this time the electrical potential of point A is greater than the electrical potential of point B, so that it means that a reverse-biased voltage is stressed to the photo thin-film transistor 260, thereby the photo thin-film transistor 260 is compensated by the reverse-biased voltage; therefore the threshold voltage will not be increased, and the value of the photo-induced current will not be decayed.

Although specific embodiments have been illustrated and described, it will be appreciated by those skilled in the art that various modifications may be made without departing from the scope of the present invention, which is intended to be limited solely by the appended claims.

What is claimed is:

1. A photo element, comprising:
   a photo thin-film transistor, for inducing a photo-induced current;
   a readout line, for reading the photo-induced current;
   a switch thin-film transistor, for controlling whether the photo-induced current is read or not, the source of the switch thin-film transistor being connected to said readout line, the gate of the switch thin-film transistor being connected to a first switch line, and the drain of the switch thin-film transistor being connected to the source of said photo thin-film transistor;
   a bias line, the gate and the drain of the photo thin-film transistor being connected to said bias line; and
   a compensation thin-film transistor, the gate and the drain of said compensation thin-film transistor being connected to a second switch line, the source of the compensation thin-film transistor being connected to the drain of said switch thin-film transistor.

2. The photo element as recited in claim 1, when a high voltage is applied to the first switch line, a bias voltage is applied to said bias line and a low voltage is applied to the second switch line; when the high voltage applied to the first switch line is reduced to a low voltage, the bias voltage is still applied to said bias line and a high voltage is applied to the second switch line, wherein the value of the bias voltage is smaller than the value of the high voltage applied to the second switch line.

3. The photo element as recited in claim 1, wherein a plurality of said photo elements are arranged in a thin-film transistor substrate of a Liquid Crystal Display, the thin-film transistor substrate comprising a plurality of gate lines and a plurality of data lines where a plurality of pixels are defined, and the plurality of said photo elements are arranged in some or all of the plurality of pixels, thereby forming a plurality of readout pixels.

4. The photo element as recited in claim 3, wherein one photo element is arranged in each blue sub-pixel.

5. The photo element as recited in claim 3, wherein the Liquid Crystal Display further comprises a detecting element for detecting the illumination of the environment, the detected illumination being feedback to a microprocessor, the microprocessor determining the value of voltage applied to said bias line according to the detected illumination.

6. The photo element as recited in claim 1, wherein said switch thin-film transistor and said compensation thin-film transistor are shadowed by a masking material, and at least a portion or the whole portion of said photo thin-film transistor is not shadowed by any masking material.

7. A driving method of a photo element, the photo element comprising a photo thin-film transistor, a readout line, a switch thin-film transistor, a bias line, and a compensation thin-film transistor, the source of the switch thin-film transistor being connected to said readout line, the gate of the switch thin-film transistor being connected to a first switch line, and the drain of the switch thin-film transistor being connected to the source of said photo thin-film transistor, the gate and the drain of the photo thin-film transistor being connected to said bias line, the gate and the drain of said compensation thin-film transistor being connected to a second switch line, the source of the compensation thin-film transistor being connected to the drain of said switch thin-film transistor, the driving method comprising the steps of:
providing continuously a bias voltage to said bias line, so that said photo thin-film transistor is maintained at open state, and a photo-induced current generated by said photo thin-film transistor is transmitted from the source of said photo thin-film transistor to said switch thin-film transistor;
applying a high voltage to the first switch line, so that said switch thin-film transistor is opened, and the photo-induced current is transmitted from the drain of said switch thin-film transistor to the source of said switch thin-film transistor to be read out via said readout line;
applying a low voltage to the first switch line, so that said switch thin-film transistor is closed; and
applying a high voltage to the second switch line, so that said compensation thin-film transistor is opened;
wherein the voltage applied to the second switch line is higher than the voltage applied to said bias line.

8. The driving method as recited in claim 7, wherein a plurality of said photo elements are arranged in a thin-film transistor substrate of a Liquid Crystal Display, the thin-film transistor substrate comprising a plurality of gate lines and a plurality of data lines where a plurality of pixels are defined, and the plurality of said photo elements are arranged in some or all of the plurality of pixels, thereby forming a plurality of readout pixels.

9. The driving method as recited in claim 8, wherein one photo element is arranged in each blue sub-pixel.

10. The driving method as recited in claim 8, wherein the Liquid Crystal Display further comprises a detecting element for detecting the illumination of the environment, the detected illumination being feedback to a microprocessor, the microprocessor determining the value of voltage applied to said bias line according to the detected illumination.

11. The driving method as recited in claim 7, wherein said switch thin-film transistor and said compensation thin-film transistor are shadowed by a masking material, and at least a portion or the whole portion of said photo thin-film transistor is not shadowed by any masking material.

12. A Liquid Crystal Display, comprising:
a thin-film transistor substrate, the thin-film transistor substrate comprising a plurality of gate lines and a plurality of data lines where a plurality of pixels are defined, and a plurality of photo elements are arranged in a portion or the whole of the plurality of pixels, thereby forming a plurality of readout pixels, wherein each of the plurality of photo elements comprises:
a photo thin-film transistor, for inducing a photo-induced current;
a readout line, for reading the photo-induced current;
a switch thin-film transistor; for controlling whether the photo-induced current is read or not, the source of the switch thin-film transistor being connected to said readout line, the gate of the switch thin-film transistor being connected to a first switch line, and the drain of the switch thin-film transistor being connected to the source of said photo thin-film transistor;
a bias line, the gate and the drain of the photo thin-film transistor being connected to said bias line; and
a compensation thin-film transistor, the gate and the drain of said compensation thin-film transistor being connected to a second switch line, the source of the compensation thin-film transistor being connected to the drain of said switch thin-film transistor.

13. The Liquid Crystal Display as recited in claim 12, when a high voltage is applied to the first switch line, a bias voltage is applied to said bias line and a low voltage is applied to the second switch line; when the high voltage applied to the first switch line is reduced to a low voltage, the bias voltage is still applied to said bias line and a high voltage is applied to the second switch line, wherein the value of the bias voltage is smaller than the value of the high voltage applied to the second switch line.

14. The Liquid Crystal Display as recited in claim 12, wherein one photo element is arranged in each blue sub-pixel.

15. The Liquid Crystal Display as recited in claim 12, wherein the Liquid Crystal Display further comprises a detecting element for detecting the illumination of the environment, the detected illumination being feedback to a microprocessor, the microprocessor determining the value of voltage applied to said bias line according to the detected illumination.

16. The Liquid Crystal Display as recited in claim 12, wherein said switch thin-film transistor and said compensation thin-film transistor are shadowed by a masking material, and at least a portion or the whole portion of said photo thin-film transistor is not shadowed by any masking material.

* * * * *